Dec. 14, 1965    F. SOLOMON ETAL    3,223,555
SEALED BATTERY STACKED ELECTRODE ASSEMBLY
Filed April 5, 1962    5 Sheets-Sheet 1
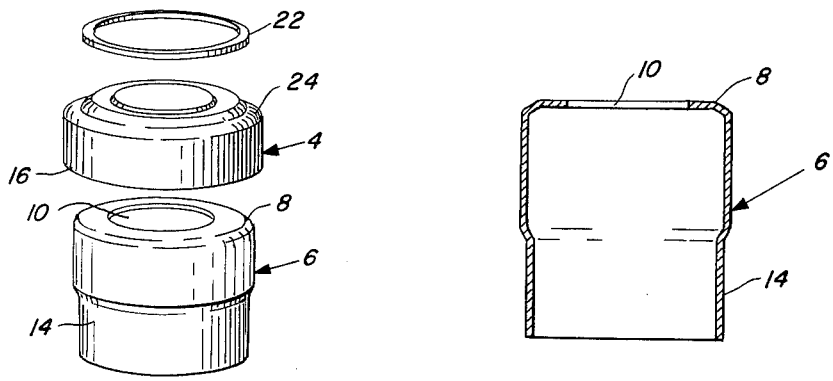
Fig. 1A
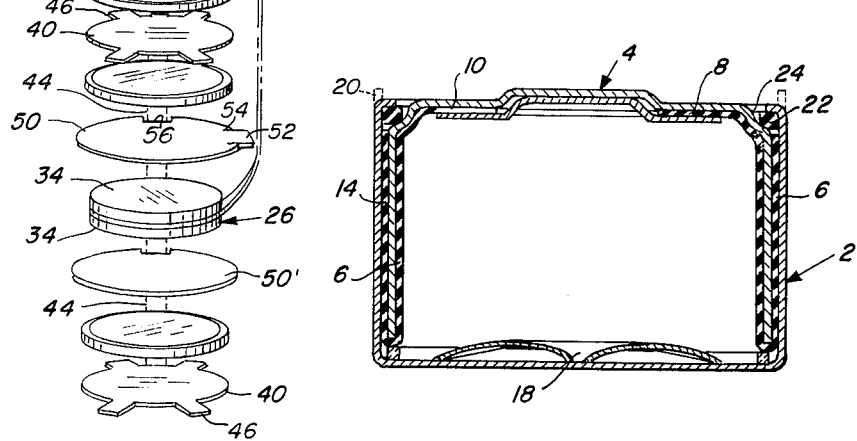
Fig. 2
Fig. 1
INVENTORS:
FRANK SOLOMON
ALBERT HIMY
BY
Irving Holtzman
ATTORNEY

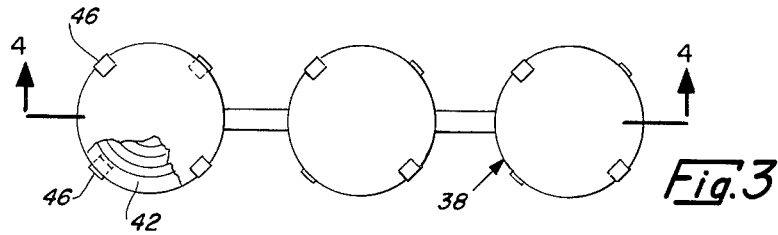
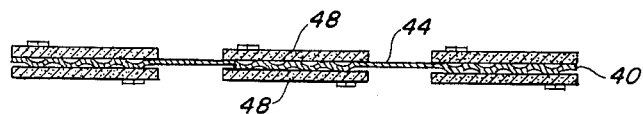
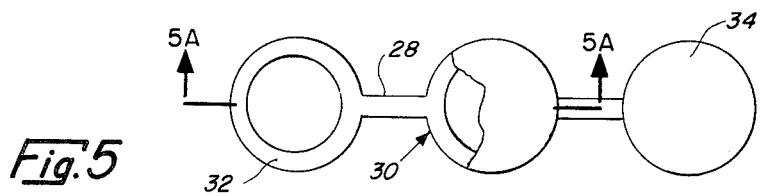
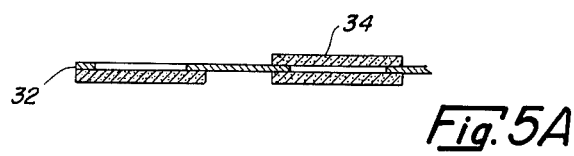
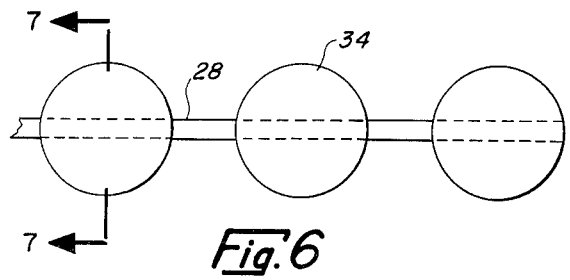
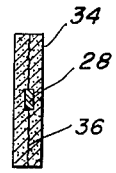

INVENTORS:
FRANK SOLOMON
ALBERT HIMY

BY *Irving Holtzman*

ATTORNEY

Dec. 14, 1965  F. SOLOMON ETAL  3,223,555
SEALED BATTERY STACKED ELECTRODE ASSEMBLY
Filed April 5, 1962  5 Sheets-Sheet 4

INVENTOR.
FRANK SOLOMON
ALBERT HIMY
BY
Irving Holtzman

Dec. 14, 1965 F. SOLOMON ETAL 3,223,555
SEALED BATTERY STACKED ELECTRODE ASSEMBLY
Filed April 5, 1962 5 Sheets-Sheet 5
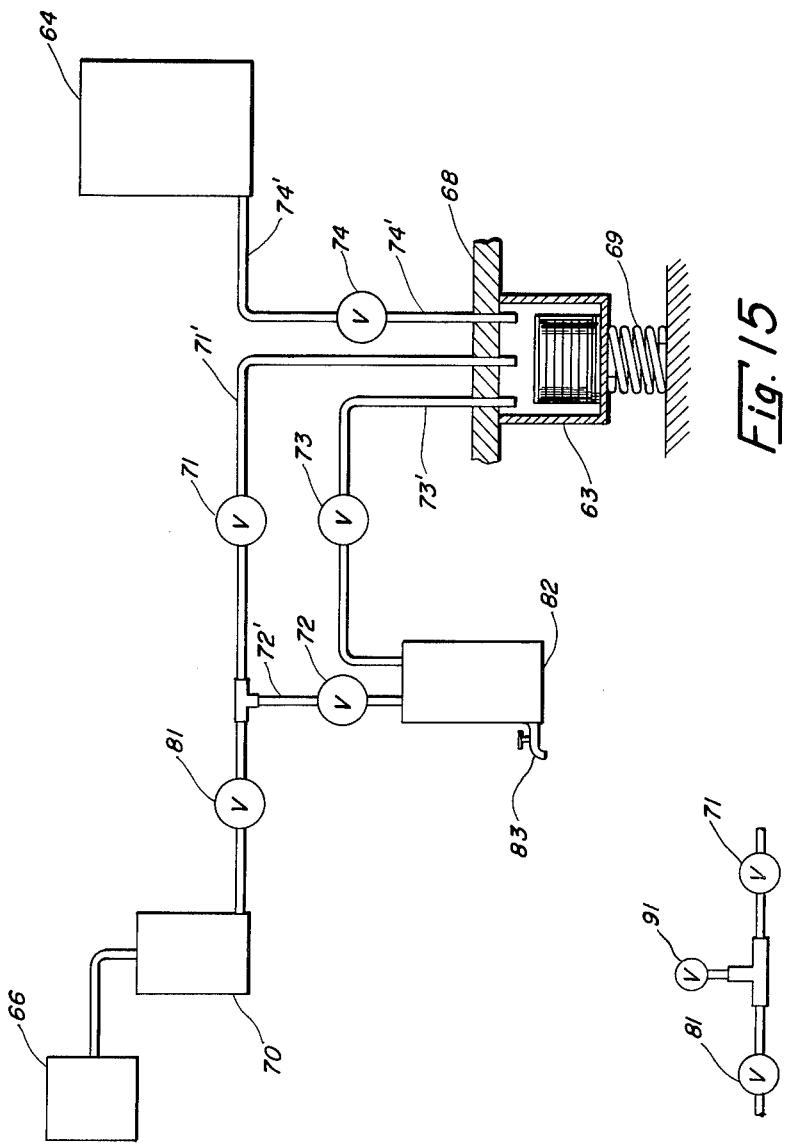
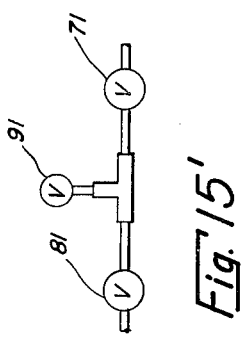
INVENTORS:
FRANK SOLOMON
ALBERT HIMY
BY
Irving Holtzman
ATTORNEY

3,223,555
SEALED BATTERY STACKED ELECTRODE ASSEMBLY
Frank Solomon, Lake Success, and Albert Himy, Elmhurst, N.Y., assignors to Yardney International Corp., New York, N.Y., a corporation of New York
Filed Apr. 5, 1962, Ser. No. 185,341
20 Claims. (Cl. 136—14)

This invention relates to hermetically sealed electrochemical cells or batteries. More particularly this invention concerns itself with cells of the above mentioned type which are often referred to in the art as "Button Cells."

There is presently a great demand for reliable sources of electric power which are small, compact and capable of delivering large quantities of energy per unit weight or volume. The alkaline silver-zinc, and silver-cadmium galvanic systems are particularly suitable for delivering a high quantity of energy per unit volume or weight. However, to date, no satisfactory hermetically sealed "Button Cells" has been designed which meets the present needs.

It is accordingly an object of the present invention to provide a hermetically sealed electrochemical cell that is reliable, long-lived, small, compact and capable of delivering large quantities of energy per unit weight and volume.

It is a further object of the present invention to provide a "Button Cell" of the above mentioned type which utilizes an alkaline silver-cadmium electrochemical system.

Other objects and features of this invention will be apparent from the following description and drawings wherein:

FIG. 1 is an exploded view of a cell assembly embodying in the present invention;

FIG. 1A is a cross-sectional view of a rubber insulating sleeve forming part of the assembly;

FIG. 2 is a cross-sectional view of the assembly shown in FIG. 1 when the elements are stacked in the casing;

FIG. 3 is a top plan view, partly in section, of a set of negative electrodes for the cell;

FIG. 4 is a cross-sectional view of the electrode unit shown in FIG. 3 taken along line 4—4;

FIG. 5 is a top plan view, partly in section, of a set of positive electrodes for the cell;

FIG. 5A is a partial cross-sectional view of an electrode shown in FIG. 5 taken along line 5A—5A thereof;

FIG. 6 is a top-plan view of another set of positive electrodes according to this invention;

FIG. 7 is a cross-sectional view taken along line 7—7 of FIG. 6;

FIG. 15 is a schematic view of a system useful for evacuating and filling the cells of this invention with electrolyte;

Figure 16:
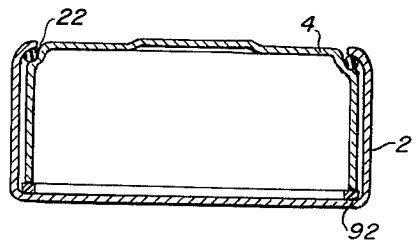
Figure 17:
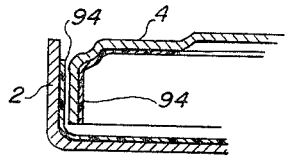
Figure 18:
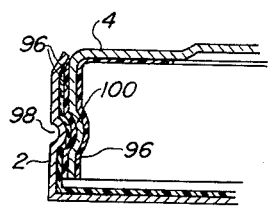
Figure 20:
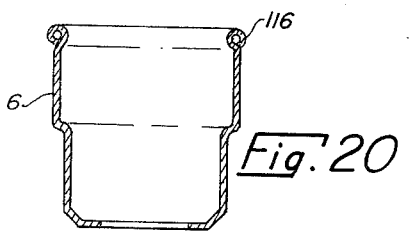
Figure 19:
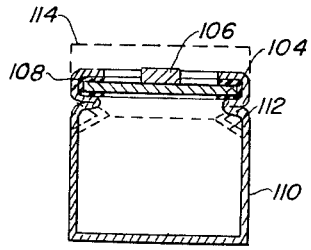
Figure 21:
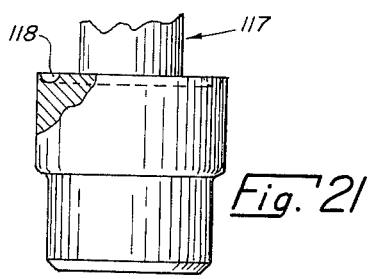
Figure 19:
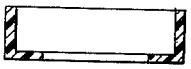

FIG. 15' is a top-plan view of the valve system shown in FIG. 15;

FIG. 16 is a cross-sectional view of another modification of this invention showing a novel hermetic sealing means for the cells, the electrodes and separators being removed for clarity;

FIG. 17 is a cross-sectional view, similar to that shown in FIG. 16, of another embodiment of this invention;

FIG. 18 is another cross-sectional view, similar to that shown in FIG. 16, illustrating still another embodiment of this invention;

FIG. 19 is a cross-sectional view of another embodiment of this invention illustrating still another hermetically sealing means, the electrodes being removed for clarity;

FIG. 19A is a cross-sectional view of a sealing gasket which may be used in place of the gasket of FIG. 19;

FIG. 20 is cross-sectional view of a modified insulator sleeve embodying this invention;

FIG. 21 is a side elevation, partly in section, of a mold which may be used in forming the insulator sleeve shown in FIG. 20.

Referring to FIGS. 1 and 2 which show a "Button Cell" embodied in the present invention, the housing is illustrated as a two-part housing consisting of an outer cup 2 and an inner cup 4 made of any suitable electrically conductive material. Among the materials that may be mentioned that are useful for this purpose are nickel-plated cold rolled steel, non-magnetic stainless steel, partially plastic-clad (e.g. polyvinylchloride-clad) steel or stainless steel, annealed nickel metal, silver-plated metal, etc.

A generally cylindrically shaped, hollow, thin walled, rubber cape insulator 6, provided with a roof 8, having a hole 10 therein is inserted into inner cup 4 and held in position by a dish shaped first polarity contact 12. The contact is spot welded or secured to the underside of the roof of inner cut 4 in any suitable manner through the hole 10 of insulator cape 6. In an alternative construction, the terminal member or contact 12 may just be held in place by pressure contact with other elements of the cell. A portion 14 of sleeve insulator 6 that extends below the edge 16 of inner cup 4 is folded upwardly so as to drape over said edge of cut 4 and form a pocket which encloses the side walls of the cup.

The rubber sleeve insulator 6 may be made of any of a variety of materials or synthetic rubber materials. These include natural latex, neoprene latex, synthetic rubber, etc.

The first terminal member 12 mentioned above and a second terminal or contact 18 described in more detail below, may also be made of any of a variety of electrically conductive materials. Particularly suitable materials are nickel plated steel, nickel plated beryllium-copper, or steel.

An assembly of positive and negative plates, with interleaved separator material also described in more detail below, is inserted into the inner cup 4. The elements so assembled are then inserted into outer cup 2 whose inner floor surface has been spot welded to said second contact 18. As in the case with the first contact, terminal 18 may also be held in position merely by pressure contact. Before inserting the assembly into outer cup 2, a gasket 17 made of any suitable insulation material (e.g. NEOPRENE), is placed in the bottom of cup 2.

The assembled cell is best seen in FIG. 2. As shown in this figure in dotted line, the marginal portion 20 of the outer cup 2 when the electrode assembly is first inserted therein is generally parallel to the short axis of the cell. This margin is then bent inwardly to seal the cell and to retain an O ring or gasket 22 of electrically insulating material which has been previously seated in recess or groove 24 provided on inner cup 4.

O ring 22 may be of a variety of constructions and may be made of various electrically insulating materials. Some materials which may be used for this purpose include synthetic or natural rubber (e.g. BUNA S, NEOPRENE), soft or rigid polyvinylchloride rings, or rings made from other thermoplastic materials, e.g. acryliccross-linked polyvinyl resins. The materials used for the O rings may be soft, medium hard or hard. Those having a DUROMETER hardness of from 55 to 70 have been used. Cells sealed with hard rubber O rings withstood a pressure of 300 p.s.i. for 5 minutes. It is also advantageous to coat said ring with an alkali-resistant coating. A particularly suitable coating for this purpose may be made from TEFLON (polytetrafluoroethylene).

In the modification of this invention, illustrated in FIGS. 1 and 2, the "Button Cell" contains a positive-electrode assembly consisting of 3 positive electrodes 26 which are electrically connected to each other by positive ribbon connectors 28. The positive-electrode assembly of this embodiment is best illustrated in FIG. 5 and comprises a positive ring collector 30 composed of three annularly shaped members 32 joined to each other by ribbon shaped connector 28. In a preferred form of this invention, the positive ring collector is stamped out of silver sheet (e.g. .005" silver sheet) as a unitary structure having annular members joined to each other by the ribbon-shaped connector members.

A pair of sintered-silver tablets 34, described more in detail below, are secured to each side of the second and third annular members 32, whereas only one silver tablet 34 is secured to the underside of the first annular member 32. Because of this arrangement, the terminal 12 is in direct contact with first annular member 32 (see FIG. 1).

The silver tablets 34 are secured to annular member 32 in any suitable fashion. In a preferred form of this invention, the silver tablets 34 are hot pressed or hot forged to the annular members 32.

As an alternative positive collector construction, the annular members 32 may be replaced by imperforate disc members which are similarly joined by ribbon collector member 28. In all other respects this alternative positive collector construction will be the same as that described above.

In still another modification of the positive collector construction as illustrated in FIGS. 6 and 7, the ring or disc member is omitted and the conductive ribbon member 28 is sandwiched between silver tablet members 34, e.g. by hot forging.

As noted above, in a preferred form of the present invention, in assembling the positive electrode assembly the collector, regardless of its particular design, is sandwiched between silver tablets and then hot forged to the same. This may be effected by using heated platens in a press at a temperature of about 600° C. and a pressure of about 500 to 1,000 p.s.i. applied for at least a minute or minute and a half.

The positive electrode assembly prepared as described above may then be electrically charged, washed and dried as described in more detail below. In the alternative, the positive plates may be charged inside the finished cell.

The silver tablet for the positive electrode may be made by mixing 90% by weight of silver powder and 10% cadmium oxide in a rolling mill to form a uniform mixture. The particle size of the materials used is about 5μ. The powder is charged into a pressing mold having a diameter of about 1 inch. The powder is compressed to a thickness of between about .025 to .035 inch using a pressure of at least about 300 lbs./sq. in. The optimum density of the tablet is about 4.8 to 5.2 g./cm.³. The tablet is then sintered at a temperature of 600° C. for about 2 minutes.

In place of the silver powder used above silver oxide powder may be employed e.g. 90% silver oxide and 10% cadmium oxide. In this case the plate is ready for use and does not need to be charged.

An advantageous alternative procedure is to include a binder in the positive electrode mix. Of special advantage are the microcrystalline waxes (e.g. CARBOWAX C–6,000, polyethylene glycol and polyethylene oxide).

In a typical composition employing a binder in the construction of the silver tablet, a mixture is formed containing 85% by weight silver powder, 10% by weight CdO and 5% by weight of CARBOWAX C–6,000.

In tabletting the mix for the positive electrode, to meet the requirements of the tabletting machine, it may be advantageous to initially have a dense tablet which is later rendered more porous. For this purpose a blowing agent such as ammonium carbonate, for example, may be included in the mix. In sintering, the blowing agent is volatilized in this manner by heat, leaving a very porous and strong plate.

In another procedure for the preparation of the positive silver tablet, a homogeneous powdered mixture is prepared by mixing 85% by weight of silver powder, 10% by weight of CdO and 5% by weight of CARBOWAX C–6,000. The tablet is pressed using a pressure of about 300 lbs./sq. in. The compressed silver tablets are then soaked in tapwater until all of the CARBOWAX, which is water soluble, is dissolved out. The tablets are then dried at a temperature of about 95° C. The tablets so formed are porous, mechanically strong and can be hot forged to the silver collector at 600° C. in less than a minute.

In an alternative form of the invention, a collector material such as expanded silver, in the form of a prepared disc, may be imbedded in the silver tablet to reinforce its strength and to provide it with improved electronic conduction.

One negative electrode assembly used in this invention is best seen in FIGS. 1, 3 and 4. The relationship of the parts of the assembly to the rest of the cell being best seen in FIG. 1 and the details of construction of the negative electrode assembly being best seen in FIGS. 3 and 4.

Referring particularly to FIGS. 3 and 4, the negative electrode assembly 38 comprises a negative collector 40 which consists of a corrugated disc shaped portions 42 electrically connected to each other by short ribbon-shaped conductors 44. The disc portions 42 are each provided with a plurality of bendable tabs 46 which are used to hold a negative electrode tablet 48 to each side of the discs 42 of collector 40.

Since the present button cell is a sealed cell, the gases, and particularly oxygen, generated in the cell should be combined with the negative electrodes. The corrugations of the disc-shaped portion 42 serves to expose as much as possible of the negative electrode tablets 48 so as to foster recombination of oxygen therewith.

In order to achieve a still better access of oxygen to the negative plate, the collector 40 may be provided with a central hole (about 50% area of the disc) or with several small holes. A FIBERGLAS or nickel grid placed on the face of the negative electrode may also be used in facilitating the access of oxygen to the negative electrode.

The negative collector 40 may be made of any suitable electrically conductive material such as nickel. In the embodiment illustrated in FIGS. 3 and 4, the collector 40 is stamped from .005" nickel sheet. The corrugations of this collector are about .012" to .015" in height. The negative electrode tablets 48 are secured to the corrugated sections 42 of collector 40 by placing a tablet on each side of the collector and then curling two diametrically opposed tabs 46 over the tablets 48.

In some cases, the negative collector 40 may be made as a flat collector rather than corrugated with or without the securing tabs 46. Where no tabs are used a conductive binder or adhesive is used to secure the negative tablets to collector. Colloidal graphite mixed with a resin adhesive binder would be suitable.

In a preferred form of this invention, the negative electrode is a cadmium tablet. The material used is preferably electroformed cadmium made from cadmium oxide. The cadmium oxide is electrolytically converted into cadmium powder in an open tank filled with a solution of KOH. The end product is carefully washed free of KOH in running water until it is chemically neutral and is then air dried. The percentage of metallic Cd obtained in this manner was 70 to 75%. By washing the product with a slightly acidic potassium chromate solution, the oxidation of the Cd during drying is reduced. Furthermore, this chromate treatment enables speeding up the drying operation through the use of a drying oven. The percentage of metallic Cd thus obtained is in the range of 80 to 85%. The material is then ground and sieved (#U.S. 40 mesh) and is now ready for use in the electrode.

In a preferred procedure of preparing the negative cadminum tablet of this invention, a mix is formed containing 95% electroformed cadmium (#40 mesh) and 5% silver powder of particle size of about $5\mu$. The mix is charged into a mold of about 1⅛ inches in diameter and a thickness of about 0.41 mil. The material is compressed into a tablet having a density of about 4.5 to 5.2 g./cm.$^3$.

In another form of this invention, a mix is formed containing 75% of the so-called cadmium MD–301, 20% CdO and 5% nickel which is then pressed into a tablet as described above. Cadmium MD–301 is a commercially available cadmium powder of 325 mesh containing 99% Cd and 1% cadium oxide. The nickel employed is preferably the so-called carbonyl nickel i.e. nickel powder made from nickel carbonyl by thermal decomposition. Instead of this mixture, a mixture consisting of 90% cadmium MD–301 and 10% AgO may be employed. This mixture is processed in the same manner.

In still another form of this invention, the cadmium tablet is prepared by mixing CdO with a binder, for example, of CARBOWAX. In this case, the CdO powder is mixed with about 2 to 10% by weight of the binder and then pressed into a circular tablet.

To increase the ease with which the cadmium tablets may be pressed, a solid lubricant such as graphite (.2% by weight) may be added to the electrode mix. Another lubricant which can be employed is a finely divided "powdered fat" in a quantity of from about .5 to 2% by weight. A product of this character is sold commercially under the name "STEROTEX." This will be leached out by electrolyte. The tablet so formed may then be attached to the collector as described above and is then electroformed (i.e. converted to metallic cadium) either inside or outside the cell.

In an alternative method, nickel wire mesh may be imbedded in negative tablet during the pressing operation to further increase the strength of the tablet. However, this is not a preferred mode of operation.

The relative areas of the negative and positive plate may vary considerably. However, particularly good results are obtained wherein the active area of the negative tablets was 28% larger than that of the positive plate.

Although not essential, it is sometimes advantageous to protect the ribbon connectors of both the positive and the negative electrode sets. These may be protected by coating the same with lacquer or varnish, encasing in polyethylene, film or by application of silicone grease e.g. by brushing. The use of tabs in the separator construction described below also offers protection to the ribbon connectors.

Figure 8:
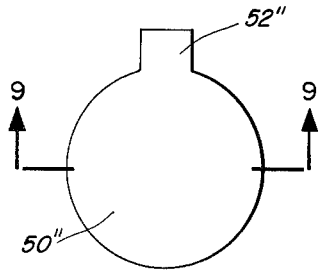
FIG. 8 is a top plan view of a separator included in the cell assembly.

In the modification of this invention shown in FIG. 1, a plurality of disc-shaped separators 50, 50″ provided with tabs 52, 52″ are interposed between each pair of negative and positive electrodes. (See FIGS. 8 and 9 for details of these separators.) The tabs 52, 52″ are positioned so that it extends beyond the edges of the electrode and is in contact with the ribbon conductors 28 or the ribbon conductors 44 of the positive or negative collector respectively. These tabs prevent the conductors from contacting an electrode of opposite polarity thus avoiding shorting the cells.

Figure 10:
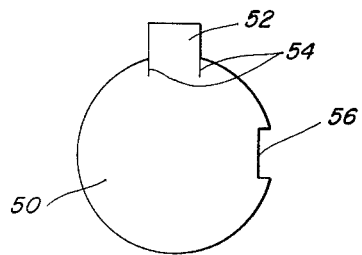
FIGS. 10 and 11 are top plan views of other separators constituting part of the assembly.

A preferred separator construction is shown in FIG. 10. In this modification, the tab 52 is provided on each side with a slit or undercut 54. This undercutting permits a closer and more flexible bending of the tab with the collectors in the assembly pack. The tab, due to this undercut, will bend in an arc instead of a sharp angle. At an angle of 90° from the midline of the tab, in this modification, the separator disc 50 is provided with a notch 56. This notch may be cut out at the same time and with the same die that is used to produce the separator and tab. It is slightly wider than the width of tab 52 as well as slightly deeper than the thickness of the tab together with the metal conductor that connects the electrodes of the same polarity.

Figure 14:
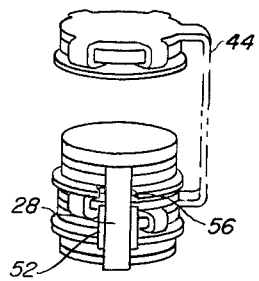
FIG. 14 is a perspective view, partly exploded, of an electrode pack embodying in the present invention, illustrating the manner of folding the electrodes and interleaving the separators.

In assembling the cell pack, as illustrated in FIG. 14, alternate interconnecting ribbon conductors 28 and 44 are arranged 90° apart when viewed from above. The tab 52 is disposed so that it contacts the collector 28 and nestles in notch 56 of the next separator. This construction has the further advantage in that it locks the entire cell pack into a unit and prevents the pack from moving axially or radially. This enables the operator assembling the cells to keep the cell pack in proper alignment.

Figure 11:
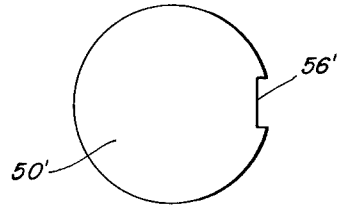

Another separator construction 50′ is shown in FIG. 11. This is similar to the construction in FIG. 10, in that a notch 56′ is provided but no tab is employed. The separator in FIG. 8 may also be provided with slits 54 shown in FIG. 10. In any one cell any combination of separator construction shown in FIGS. 8 to 11 may be used depending upon the particular requirements and location of the separator in the cell pack.

A variety of separator materials may be used in constructing the separators used in the present cells. It is usual to use several separate layers of materials in constructing the separator. These are difficult to handle as separate entities in assembling the cell pack. This difficulty may be circumvented by constructing an integral separator from the necessary separator materials. The most convenient method involves glueing the necessary separator materials together in the desired sequence in long sheets and then stamping out the unitary separator sets.

A suitable unitary separator may be made by glueing 2 sheets of unplasticized regenerated cellulose (i.e. sausage casing) material of .003″ thick or a single sheet .006″ thick between two layers of nylon fabric each of about .004″ thick and then stamping the unitary separator from the glued assembly.

The nylon fabric used is preferably a nylon fabric treated with a chrome complex of acrylic acid which forms bonds with nylon fibers. On heating, the acrylic acid is polymerized, forming a strongly attached coating on the nylon fabric.

In one procedure for preparing the nylon separator material, a solution is formed containing 468 grams of water, 22 grams of 1% aqueous ammonia and 10 grams of a chrome complex of acrylic acid (e.g. VOLAN A or QUILLON). The materials are mixed to insure that no precipitate is formed. The nylon fabric is dipped in this solution for about 5 minutes, removed and placed in an oven at 250° F. for 5 minutes. The coated nylon material is then washed in cold water.

An adhesive that may be used to glue the layers of material together is 10% aqueous solution of polyvinyl alcohol. The preferred material is 99.9%-hydrolyzed polyvinyl alcohol. Five percent diethylene glycol is added to this solution to serve as a plasticizer.

Figure 9:
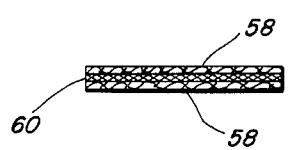
FIG. 9 is a cross-sectional view taken along line 9—9 of FIG. 8.

The materials are assembled so that, as shown in FIG. 9, there is a top and bottom layer of nylon 58 and an intermediate layer or layers of sausage-casing material 60. The laminate so formed is allowed to semi-harden and then placed on a wooden form, tightly stretched, fastened in the stretched condition and allowed to dry. The drying operation takes approximately 16 hours. The end product is a sheet of separator material, smooth and free of wrinkles.

In another modification of this invention, the separator may be formed as described above excepting that in place of one of the fabric nylon layers a non-fabric material such as porous paper is employed. One paper which may be employed is sold under the trademark VISKON. This separator has the advantage over the separator described above in that it is more economical to manufacture.

Still another separator may be used which is made using the procedure outlined above but containing 3 layers of nylon fabric on one side each of about 3.7 mils thick, an intermediate section of 6 sheets of silver cellulosate film prepared for example as described in U.S. Patent No. 2,785,106; each having thickness of about 1 mil, and 1 sheet of paper (e.g. Viskon) of about 4 mils in thickness. In an alternative construction, the individual layers of material need not be glued together but may merely be laid one on top of the other.

In the operation of the "Button Cell" of this invention it has been found that the Cd electrodes expand radially after a few cycles. This growth is undesirable since it creates a danger of short circuit when the expansion of Cd reaches the edges of the separators.

Figure 12:
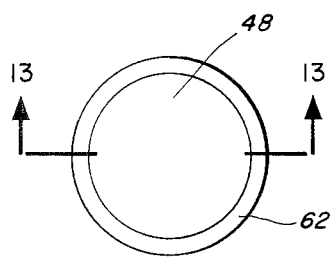
FIG. 12 is a top plan view of a modified negative electrode according to the present invention, illustrating the use of a retaining ring.
Figure 13:
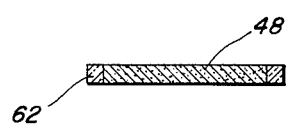
FIG. 13 is a cross-sectional view of FIG. 12 taken along line 13—13 thereof.

This difficulty can be remedied by placing a snugly fitting retaining ring over the edge of the negative cadmium electrode tablet. This is illustrated in FIGS. 12 and 13 wherein the negative cadmium tablet is designated as 48 and the retaining ring or grid arrester is shown at 62. The ring 62 may be made of a variety of materials including plastics or metals. Among the materials that can be used there is included unplasticized polyvinylchloride resin, thermoplastic polystyrene, polyethylene, Teflon, acrylic acid resin, methacrylic acid resin, methyl methacrylate resins, nylon, etc. A metal that may be employed for this purpose is nickel. A suitable thin walled nickel tubing from which the retaining rings may be cut has been made by means of electroforming over a core of metallized wax. A variety of tubing shapes may be made in this fashion.

In assembling the cell pack for insertion into the inner cup 4 of the housing, the operator may arrange a strip of negative electrodes for example as shown in FIG. 3 so that the long axis of the strip is horizontally disposed. A first separator is then placed over a negative electrode located at one end of the strip so that the tab 52 of said separator overlies the conductor 44. A strip of positive electrodes for example as shown in FIG. 5, is then positioned so that the long axis of this strip is at right angle to the negative electrode strip and so that an end electrode of the positive strip overlays said first separator already positioned on the negative electrode strip. A second separator is then positioned on said end electrode of said positive electrode strip so that the tab 52 overlays the conductor 28 of the positive electrode strip adjacent said end positive electrode. The tab of the second separator is thus displaced 90° with respect to the tab of the first separator. The negative electrode strip is then folded over in a horizontal direction along a fold line which runs through about the center line of the negative conductor 44 and so that a second negative electrode now overlays said second separator strip. After positioning a third separator over said second negative electrode with the tab 52 overlaying conductor 44 of the electrode, the positive strip of electrodes is folded downwardly so that a second positive electrode now overlays the third separator. These operations are repeated until all of the electrodes are folded into the stack so that a separator is positioned between each pair of electrodes of opposite polarity. The tabs 52 are thus positioned so as to separate the conductors of strip of electrodes of one polarity from the electrode of opposite polarity.

When the separator shown in FIG. 10 is employed, the separators are placed so that the tab 52 of a separator laying below registers with a notch 56 of the separator next in line above it. The separators are thus locked in position and prevent the rotation of the elements of the cell pack.

In certain locations in the cell pack, the tab 52 or the notch 56 will serve no function such as for example, the starting and ending separators. Where this is the case, the tab or the notch is not formed in the separator.

Before packing the electrode assembly in the casing, it is soaked in electrolyte. This is effected by clamping an electrode pack dry and subjected it then to treatment with electrolyte which is preferably a 38% aqueous KOH solution. A static penetration method may be utilized in which the electrode pack is tightly held in a non-metallic clamping device and dipped into beakers containing the electrolyte. In another procedure, the electrode pack is first subjected to a vacuum and then saturated with electrolyte. The dwell time of the electrode pack in the electrolyte will vary from case to case. In the static penetration method, the dwell time may vary from 15 minutes to 20 hours. A particularly suitable dwell time is 10 hours. With the vacuum method under a vaccum of 25" maximum, saturation was achieved in 15 minutes.

The amount of KOH that is retained in the pack may also vary. However, good results are achieved from cells that contain KOH in the range of from 17% to 22% of the total weight of the cell pack.

A system for vacuum impregnating the electrode assembly with aqueous KOH is shown schematically in FIG. 15. In this drawing, 68 is a rigid top, such as a table top, which is provided with holes through which conduits 74′, 73′ and 71′ pass. Cell casing 63, containing the electrode assembly is held in position against top 68 by means of spring assembly 69. The cell casing 63 is connected with KOH solution supply tank 64 by means of conduit 74′ and the flow of this solution is controlled by valve 74.

Cell casing 63 is also connected to a vacuum pump 66 through a conduit 71′ and an intermediary container 70. The communication of the vacuum pump with the casing 63 is controlled by means of valves 71 and 81.

The conduit 71′ is further connected to an electrolyte collector vessel 82 by means of conduit 72′. The flow of fluids to an from the former to the latter is controlled by a valve 72. Collector vessel 82 is also connected to casing 63 by means of conduit 73′ and the flow of fluids therethrough is controlled by valve 73. A tap 83 is provided in vessel 82 to remove electrolyte that accumlates therein.

In operation, to evacuate the cell, the casing 63 is secured to top 68 and valves 71 and 81 are opened. Valves 72, 73 and 74 are closed. The vacuum pump is then turned on and allowed to operate until the desired vacuum is created in the cell.

To fill the cell with electrolyte, valves 71, 81, 72 and 73 are closed and valve 74 is opened. The vacuum created in the cell draws the liquid electrolyte from storage supply tank 63. The cell is permitted to stand in this condition for the time periods indicated above. To remove excess electrolyte from the cell, valves 72, 73 and 81 are opened and valves 71 and 74 are closed. The vacuum pump is then turned on again and the vacuum created transfers the excess electrolyte from casing 63 to container 82. Container 82 is made of sufficient size that the electrolyte collected therein does not overflow and run into the vacuum system. The electrolyte that collects in container 82 is removed by means of tab 83.

A relief valve 91 may be provided in the system. This is best seen in FIG. 15′, the top plan view of the valve system disposed above container 82 as shown in FIG. 15.

After assembly of the cell, as described above, it has the appearance seen in FIG. 2, the marginal edge of the outer cup having the upstanding position shown in dotted line. In this condition, the cell is placed between the closing dies of a hydraulic press and the dies are brought together. This sealing operation may be effected under room condition or under a partial vacuum.

A number of alternative arrangements for hemetically sealing the "Button Cells" of the present invention are possible. In the modification shown in FIG. 16, for example, an O ring, as described above, is used as a top closure. A flat washer type gasket 92 of synthetic or natural rubber is used as the elastomeric means which separates the outer case from the inner case.

In the modification shown in FIG. 17, the inner and outer cases 4 and 2 are each provided with a preformed removable resin (e.g. unplasticized polyvinyl chloride, ethyl cellulose) insert 94. This serves to effectively insulate one case from the other. If desired, an O ring similar to that shown in FIG. 16 may also be employed.

The modification of the invention shown in FIG. 18 comprises an outer cup or case 2 provided with an inner coating of baked or air dried "TEFLON" (tetrafluoroethylene resin). A similar coating is placed on both the inner and outer surface of inner case of cup 4. In this modification each of the cases 2 and 4 are provided with a circumferential groove 98 and 100 respectively at a predetermined part of the casing. These grooves provide a "snap-in" action which will help in providing additional sealing moment in the cell.

In still a further embodiment of the present invention, the inner case or cup containing the cell pack, prior to inserting the same into the outer case or cup, is provided with an elastomeric coating as a form of preassembly. In preparing these, the inner cups are held on their outside by suitable means such as magnet or vacuum suction devices and are dipped into a latex coagulant solution. Solutions of these types are well known in the art and any type will function in this invention. Upon removal from this solution and drying, the cups coated with the coagulant layer are dipped into a latex dispersion and subsequently cured under elevated temperature.

In the modification shown in FIG. 19, a polarity contact is provided having a disc-shaped base 104 and a button 106. This may be machined from steel and nickel plated. An annular section 108 of heat shrinkable tubing is cut and placed around the disc. Tubing which will serve this purpose is, for example, irradiated fluorocarbon tubing sold under the trade name "THERMOFIT." Another material which is useful is sold under the name "SCOTCH-TITE" (#3024 or 3025). This tubing has the property of shrinking when exposed to a temperature of 150° F.

The polarity contact and heat shrinkable tubing assembly is then heated to the temperature at which said tubing shrinks so that said annular section very tightly engages the polarity cap.

The lower half of the cell is composed of a conductive metal shell 110 provided with an internal rib 112. The form of the shell with its rib best seen in dotted line. The polarity cap with its gasket formed of the heat shrinkable material is seated on said internal rib 112 after the prepared electrode assembly has been placed in the shell 110. The assembly is then crimped to the form shown in full line whereby the rib 112 is collapsed and the free marginal edge 114 of the shell 110 is bent inwardly, thus closing the cell.

Other forms of gaskets may also be used in this modification of the invention. One such construction is shown in FIG. 19A. These may be thermoplastic or thermosetting but are preferably of vinyl resins produced by molding.

An experimental unit having this construction shown in FIG. 19 was tested and withstood a pressure of 300 p.s.i. for 3 minutes.

Another facet of the present invention is illustrated in FIG. 20. In this aspect of the invention a rubber sleeve insulator of the type shown at 6 in FIGS. 1 and 2 is provided. In this case, however, the sleeve is provided with a reinforced rim 116 which is unitary with the remainder of the cape. This is fabricated using a mold 117 shown in FIG. 21 provided with a semicircular annular groove 118 for collection and retention of latex material. The elastomeric material such as natural or synthetic rubber is cured onto said mold, after the same has been provided with a layer of appropriate latex coagulant. This insulator cape has an advantage in that the O ring described above is eliminated.

Whereas the invention has been described with reference to specific forms thereof, it will be understood that many changes and modifications may be made without departing from the spirit of this invention.

What is claimed is:

1. An electrochemical battery cell comprising a generally cylindrical casing and a stacked electrode assembly in said casing, said assembly including a plurality of disk-shaped first electrodes of one polarity, at least one disk-shaped second electrode of opposite polarity between said first electrodes, disk-shaped separators between said first and second electrodes, at least one of said separators having a marginal tab bent over in axial direction of the stack and overlying the periphery of said second electrode, and a conductor ribbon interconnecting said first electrodes alongside said stack, said ribbon registering with said tab and being held by said tab out of contact with said second electrode.

2. A cell as defined in claim 1 wherein the separator provided with said tab has radial incisions alongside said tab whereby a notch is formed upon the bending of said tab, said conductor ribbon being received in said notch.

3. A cell as defined in claim 1 wherein each separator provided with a tab has radial incisions alongside said tab whereby a further notch is formed upon the bending of said tab, the conductor ribbon registering with said tab being received in said further notch.

4. A cell as defined in claim 1 wherein at least one of said electrodes is a tablet of active negative material surrounded by an inert retaining ring.

5. A cell as defined in claim 4 wherein said negative material is cadmium.

6. A cell as defined in claim 1 wherein at least one of said electrodes includes a mixture of comminuted active material with a binder.

7. A cell as defined in claim 6 wherein said binder is a microcrystalline wax.

8. A cell as defined in claim 1 wherein at least one of said electrodes comprises a porous sintered body.

9. A cell as defined in claim 8 wherein said sintered body consists essentially of silver.

10. A cell as defined in claim 1 wherein said conductor ribbon is integrally formed with a plurality of disk-shaped portions, the electrodes interconnected by said ribbon including pairs of disk-shaped bodies of active material respectively sandwiching said portions between them.

11. A cell as defined in claim 10 wherein said disk-shaped portions are corrugated.

12. A cell as defined in claim 10 wherein said disk-shaped portions are annular.

13. A cell as defined in claim 10 wherein said disk-shaped portions are provided with marginal retaining lugs bent over into engagement with said bodies of active material.

14. A cell as defined in claim 10 wherein said disk-shaped portions are apertured.

15. A cell as defined in claim 1 wherein each conductor ribbon is fused onto the bodies of the electrodes interconnected thereby.

16. A cell as defined in claim 1 wherein said casing comprises two oppositely interleaved cup-shaped metallic members with an intervening insulating sleeve and with exposed end walls conductively connected to electrodes of opposite polarities of said stack.

17. A cell as defined in claim 16, further comprising conductive terminal members interposed between said end walls and adjacent electrodes of said stack.

18. A cell as defined in claim 1 wherein said casing comprises two oppositely interleaved cup-shaped metallic members with intervening spaced-apart insulating rings holding said members out of mutual contact, and with exposed end walls conductively connected to electrodes of opposite polarity of said stack.

19. An electrochemical battery cell comprising a generally cylindrical casing and a stacked electrode assembly in said casing, said assembly including a plurality of disk-shaped first electrodes of one polarity, a plurality of disk-shaped second electrodes of opposite polarity interleaved with said first electrodes, disk-shaped separators between said first and second electrodes, certain of said separators having marginal tabs angularly offset from one another, said tabs being bent over in axial direction of the stack and overlying the peripheries of adjacent electrodes of different polarities, a first conductor ribbon interconnecting said first electrodes alongside said stack, and a second conductor ribbon interconnecting said second electrodes alongside said stack in an angularly offset position from said first conductor ribbon, said ribbons registering with respective tabs and being held thereby out of contact with the electrodes overlain by said tabs.

20. A cell as defined in claim 19 wherein each of said separators except at most one end separator is formed with a tab and each of said separators except at most one opposite end separator is formed with a marginal notch, said notches being angularly aligned with the tabs of adjoining separators and receiving the latter tabs in their bent-over positions.

References Cited by the Examiner

UNITED STATES PATENTS

| | | | |
|---|---|---|---|
| 2,227,463 | 1/1941 | Neale | 136—13 |
| 2,469,508 | 5/1949 | Malki et al. | 136—6 |
| 2,616,939 | 11/1952 | Fischbach | 136—90 |
| 2,677,006 | 4/1954 | Ameln | 136—20 |
| 2,738,375 | 3/1956 | Schotter | 136—30 |
| 2,925,456 | 2/1960 | Beusker et al. | 136—145 |
| 2,934,581 | 4/1960 | Dassler | 136—9 |
| 2,971,999 | 2/1961 | Jacquier | 136—6 |
| 2,981,779 | 4/1961 | Freund | 136—90 |
| 3,002,041 | 9/1961 | Daley | 136—176 |
| 3,108,908 | 10/1963 | Krebs | 136—6 |

FOREIGN PATENTS

| | | |
|---|---|---|
| 808,007 | 1/1959 | Great Britain. |

WINSTON A. DOUGLAS, *Primary Examiner.*

MURRAY TILLMAN, JOHN H. MACK, *Examiners.*